(12) United States Patent
Kim et al.

(10) Patent No.: US 7,912,150 B2
(45) Date of Patent: Mar. 22, 2011

(54) APPARATUS AND METHOD FOR TRANSMITTING/RECEIVING DATA IN A CDMA MOBILE COMMUNICATION SYSTEM

(75) Inventors: Hun-Kee Kim, Seoul (KR); Yong-Suk Moon, Songnam-shi (KR); Jae-Seung Yoon, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 791 days.

(21) Appl. No.: 11/851,275

(22) Filed: Sep. 6, 2007

(65) Prior Publication Data

US 2008/0056202 A1 Mar. 6, 2008

Related U.S. Application Data

(62) Division of application No. 10/282,472, filed on Oct. 29, 2002, now Pat. No. 7,280,606.

(30) Foreign Application Priority Data

Oct. 29, 2001 (KR) .............................. 10-2001-66887

(51) Int. Cl.
*H04L 27/00* (2006.01)
*H04L 27/06* (2006.01)
(52) U.S. Cl. ........................................ 375/316; 375/340
(58) Field of Classification Search .................. 375/261, 375/279–281, 329, 332, 316, 340; 332/103
See application file for complete search history.

(56) References Cited

U.S. PATENT DOCUMENTS

| | | | |
|---|---|---|---|
| 5,970,098 A | 10/1999 | Herzberg | |
| 6,888,789 B1 | 5/2005 | Sakoda et al. | |
| 6,892,341 B2 | 5/2005 | Golitschek et al. | |
| 7,093,178 B2 | 8/2006 | Kim | |
| 7,362,733 B2 * | 4/2008 | Kim et al. | 370/335 |
| 2002/0199147 A1 * | 12/2002 | Kim et al. | 714/748 |
| 2003/0120995 A1 * | 6/2003 | Kim et al. | 714/786 |
| 2006/0203934 A1 | 9/2006 | Sudo et al. | |

FOREIGN PATENT DOCUMENTS

| | | |
|---|---|---|
| EP | 1 427 128 A1 | 6/2004 |
| JP | 11-177648 | 7/1999 |
| JP | 2000-201132 | 7/2000 |
| JP | 2001-077788 | 3/2001 |

* cited by examiner

*Primary Examiner* — Tesfaldet Bocure
(74) *Attorney, Agent, or Firm* — The Farrell Law Firm, LLP

(57) ABSTRACT

A method and apparatus for receiving data produced by mapping high-priority bits to a high-reliability bit position and low-priority bits to a low-reliability bit position in symbols, in a receiver in a mobile communication system. The apparatus includes a demodulator for demodulating the high-priority bits from the high-reliability bit position and the low-priority bits from the low-reliability bit position in the symbols; a position exchange for exchanging the position of the high-priority bits with the position of the low-priority bits in an original order if a transmitter has exchanged the bit positions; a controller for controlling the positions of the high-priority bits and the low-priority bits according to whether the transmitter has exchanged the bit positions; and a combiner for combining the high-priority bits and the low-priority bits with previously received same bits.

2 Claims, 11 Drawing Sheets

BIT-MAPPING ORDER : I₁Q₁I₂Q₂

BIT-MAPPING ORDER : I₁Q₁I₂Q₂

BIT-MAPPING ORDER : I₁Q₁I₂Q₂

BIT-MAPPING ORDER : I₁Q₁I₂Q₂

APPARATUS AND METHOD FOR TRANSMITTING/RECEIVING DATA IN A CDMA MOBILE COMMUNICATION SYSTEM

PRIORITY

This application is a divisional application of application Ser. No. 10/282,472, which was filed on Oct. 29, 2002, and issued as U.S. Pat. No. 7,280,606 on Oct. 9, 2007, and claims priority to an application filed in the Korean Industrial Property Office on Oct. 29, 2001 and assigned Serial No. 2001-66887, the contents of which are hereby incorporated by reference herein.

BACKGROUND OF THE INVENTION

1. Field of the Invention

The present invention relates generally to an apparatus and method for transmitting/receiving data in a CDMA (Code Division Multiple Access) mobile communication system, and in particular, to an apparatus and method for transmitting/receiving data with an increased reliability.

2. Description of the Related Art

It is impossible in practice to receive pure signals without signal distortion or noise. The influence of distortion or noise is more severe in a wired network than in a wireless network.

Accordingly, great amounts of time and energy have been expended toward minimizing the influence of distortion or noise involved with signal transmission and reception in a mobile communication system. The major method of reducing the effects of distortion and noise is through error control coding. Codes used for the error control coding are divided into memoryless codes and memory codes. The memoryless codes include a linear block code. The memory codes include a convolutional code and a turbo code. A channel encoder generates the code to include systematic bits and parity bits according to an error control coding technique. The turbo code is generally used for the error control coding. A systematic convolutional code also has systematic bits and parity bits.

The systematic bits are information bits transmitted from a transmitter to a receiver, and the parity bits are added at channel encoding to correct at decoding errors generated during transmission of the systematic bits. Even for an error control coded signal, burst errors in systematic bits or parity bits are difficult to correct for. The burst errors, which are often generated on a fading channel, can be prevented by interleaving. Interleaving is performed to distribute data having the same information to overcome the shortcoming of the error control coding.

An interleaved signal is mapped on a symbol basis in a digital modulator. The symbol mapping refers to designation of symbol positions in a two-dimensional plane (a symbol constellation) having an I channel along an X axis and a Q channel along a Y axis. It is determined according to a modulation scheme such as QPSK (Quadrature Phase Shift Keying), 8PSK, 16QAM (Quadrature Amplitude Modulation) and 64QAM. The symbol mapping is performed according to the number of bits in a modulation symbol and the values of the bits. The number of bits in a modulation symbol depends on a modulation scheme as listed in Table 1.

TABLE 1

| Modulation | Number of bits mapped |
|---|---|
| QPSK | 2 |
| 8PSK | 3 |
| 16QAM | 4 |
| 64QAM | 6 |

Referring to Table 1, the number of bits in a modulation symbol increases as a modulation order increases. For example, one modulation symbol includes at least four bits in a modulation scheme having a modulation order equal to or greater than that of 16QAM. Bits are mapped to a modulation symbol in the symbol constellation.

Transmission reliability and symbol mapping according to modulation schemes will be described with reference to FIGS. 1, 2 and 3.

As illustrated in Table 1, one symbol in a general modulation scheme contains a plurality of coded bits and is represented by a point in a symbol constellation. The symbol constellation is divided into four macro regions (hereinafter, four quadrants), left, right, up and down according to positions along the X axis (I channel) and the Y axis (Q channel). Micro regions, namely, demodulation regions, are defined in each quadrant. Part of coded bits in a modulation symbol designate one of the four quadrants and the other coded bits designate a demodulation region or specific coordinates in the designated quadrant. The former coded bits are referred to as quadrant determining bits, and the latter coded bits are referred to as demodulation determining bits. Both I and Q channel values are positive in the first quadrant, I channel values are negative and Q channel values are positive in the second quadrant, both I and Q channel values are negative in the third quadrant, and I channel values are positive and Q channel values are negative in the fourth quadrant. The demodulation regions can be further divided according to other modulation schemes used.

During symbol transmission on a radio channel, most errors occur in demodulation regions in the same quadrant. Thus the error probability of quadrant determining bits is higher than that of demodulation determining bits. In other words, the quadrant determining bits have a relatively high reliability, whereas the demodulation determining bits have a relatively low reliability. In a modulation symbol, macro region determining bits are referred to as high-reliability bits, micro region determining bits are referred to as low-reliability bits, and any remaining bits are referred to as medium-reliability bits. These are bit reliabilities in the symbol.

FIGS. 1, 2 and 3 are diagrams illustrating symbol constellations representing the bit reliabilities of a symbol in 8PSK, 16QAM, and 64QAM, respectively.

Referring to FIG. 1, one modulation symbol contains three coded bits in 8PSK. The three coded bits determine the position of the symbol in the symbol constellation. Specifically, the first two bits indicate one of the four quadrants, and the remaining one bit indicates a point (coordinates) in the quadrant. For example, if a symbol has coded bits "011", the quadrant determining bits "01" indicates the second quadrant and the demodulation determining bit "1" indicates a specific mapping point in the second quadrant.

Referring to FIG. 2, one modulation symbol occupies four coded bits in 16QAM. The first two quadrant determining bits indicate one of the four quadrants and the other two demodulation determining bits indicate a particular demodulation region in the quadrant. In FIG. 2, four demodulation regions are defined in each quadrant. For example, coded bits "1011"

are mapped to a particular symbol indicated by the demodulation determining bits "11" in the second quadrant indicated by the quadrant determining bits "10".

Referring to FIG. 3, one modulation symbol contains six coded bits in 64QAM. The first two quadrant determining bits indicate one of the four quadrants and the other four demodulation determining bits indicate a particular demodulation region in the quadrant. In the 64QAM symbol constellation, four main demodulation regions are defined in each quadrant and four sub-demodulation regions are defined in each main demodulation region. For example, coded bits "1101111" are mapped to an upper left symbol indicated by the sub-demodulation determining bits "11" in the upper left main demodulation determining bits "11" in the second quadrant indicated by the quadrant determining bits "10". In FIG. 3, the main demodulation regions are marked with bold dotted lines and the sub-demodulation regions are marked with slender dotted lines.

Table 2 below illustrates symbol reliability patterns for 8PSK, 16QAM, and 64QAM.

TABLE 2

| Modulation | Symbol reliability pattern |
|---|---|
| 8PSK | [H, H, L] |
| 16QAM | [H, H, L, L] |
| 64QAM | [H, H, M, M, L, L] |

In Table 2, H denotes a high reliability, M denotes a medium reliability, and L denotes a low reliability.

FIG. 4 is a block diagram of a transmitter in a typical HSDPA (High Speed Downlink Packet Access) mobile communication system. Referring to FIG. 4, the transmitter includes a channel encoder 430, an interleaver 440, and a modulator 450.

Upon input of N transport blocks from a data source 410, a CRC adder 420 adds CRC bits to each transport block. The channel encoder 430 encodes the CRC-attached N transport blocks at a code rate, for example; ½ or ¾. If the channel encoder 430 supports a plurality of coded rates through symbol puncturing or repetition with a mother code rate of ⅙ or ⅕, an operation for selecting one of the code rates is required. In the transmitter, the channel encoder 430 determines its code rate under the control of a controller 460.

While a rate matcher is not illustrated in FIGS. 4, 5 and 6, if required, it can be disposed between the channel encoder 430 and the interleaver 440. In this case, the rate matcher matches the data rate of the coded bits by repetition and puncturing when transport channel-multiplexing is needed, or if the number of the coded bits is different from that of bits to be transmitted through the air. The operation of the rate matcher will not be described hereinafter.

To minimize data loss caused by burst errors, the interleaver 440 interleaves the coded bits. The modulator 450 maps the interleaved bits to symbols in a modulation scheme determined by the controller 460. The controller 460 selects the code rate and the modulation scheme according to the current radio channel condition. To selectively use QPSK, 8PSK, 16QAM, and 64QAM according to the radio environment, the controller 460 supports AMCS (Adaptive Modulation and Coding). Though not shown, transmission data is spread with a Walsh code for channelization and spread with a PN (Pseudorandom Noise) code for identifying a BS.

The output of the channel encoder 430 is divided into systematic bits and parity bits that differ in priority. When transmission data has a particular error rate, it is better for decoding at a receiver to have errors in the parity bits than in the systematic bits because the systematic bits are real data and the parity bits are added for error correction at decoding, as described before.

Therefore there is a need for dealing with systematic bits and parity bits discriminately according to their priority levels in symbol mapping. To meet the need, SMP (Symbol Mapping based on Priority) is discussed for HSDPA (High Speed Downlinks Packet Access) standardization. SMP is a technique of combining the priorities of coded bits with reliabilities in a symbol. By SMP, high-priority coded bits and low-priority coded bits are mapped to high-reliability bit locations and low-priority bit locations, respectively in symbol mapping in order to reduce the probability of generating errors in relatively significant bits and thus improve reception performance.

FIG. 5 is a block diagram of a transmitter in a conventional HSDPA mobile communication system supporting SMP. The transmitter is characterized by mapping high-priority systematic bits to high-reliability bit locations in a symbol.

Referring to FIG. 5, a channel encoder 530 separately outputs systematic bits and parity bits. A first interleaver 540 and a second interleaver 550 separately interleave the systematic and parity bits. The first and second interleavers 540 and 550 are physically or logically separated to allow the coded bits to be mapped to symbols according to their priority levels. A PSC (Parallel-to-Serial Converter) 560 converts the interleaved systematic and parity bits to a serial bit stream according to the modulation scheme of a modulator 570 and the code rate of the channel encoder 530 under the control of a controller 580, taking into consideration that the number of systematic bits and parity bits change according to the code rate. The modulator 570 maps the serial bits to symbols. The symbols have a reliability pattern [H, H, L] in 8PSK, [H, H, L, L] in 16QAM, and [H, H, M, M, L, L] in 64QAM. Also shown are data source 510 and CRC adder 520.

Implementation of SMP in 16QAM will be described below.

When the code rate is ½ and the modulation scheme is 16QAM, the channel encoder 530 outputs systematic bits and parity bits which are equal in number, and each modulation symbol output from the modulator 570 has a reliability pattern [H, H, L, L]. Thus two systematic bits are mapped to a high reliability part (H), and two parity bits are mapped to a low reliability part (L).

When the code rate is ¾ and the modulation scheme is 16QAM, the channel encoder 530 outputs systematic bits and parity bits at a ratio of 3:1, and each modulation symbol output from the modulator 570 has a reliability pattern [H, H, L, L]. Thus two of three systematic bits are mapped to a high reliability part (H), and one systematic bits and one parity bit are mapped to a low reliability part (L).

The SMP technique implemented in the transmitter illustrated in FIG. 5 is disclosed in Korea Patent Application No. 2001-17925 filed by the present applicant, the contents of which are incorporated herein by reference.

FIG. 6 is a block diagram of a transmitter in a conventional HSDPA mobile communication system supporting CoRe (Constellation Rearrangement).

The CoRe technique is an advanced retransmission method under discussion, in which the reliabilities of bits in each symbol are averaged by rearranging a high-order modulation constellation at a retransmission. To achieve the purpose of the CoRe technique, the transmitter illustrated in FIG. 6 further includes a rearrangement controller 670. The same components as in the transmitter illustrated in FIG. 4 will not be described.

Referring to FIG. 6, the rearrangement controller 670 provides overall control in cooperation with a controller 660 to rearrange previously coded bits upon request for a retransmission from a receiver. A modulator 650 maps interleaved coded bits to symbols in a constellation which can be changed according to the number of transmission occurrences.

FIGS. 7A to 7D illustrate examples of constellations for initial transmission and retransmissions. Specifically, FIG. 7A illustrates a constellation for an initial transmission, FIG. 7B illustrates a constellation for a first retransmission, FIG. 7C illustrates a constellation for a second retransmission, and FIG. 7D illustrates a constellation for a third retransmission. For a fourth retransmission and afterwards, the constellations illustrated in FIGS. 7A to 7D are repeatedly used in sequence.

For example, coded bits "0011" are mapped to the upper right symbol in the first quadrant at an initial transmission as illustrated in FIG. 7A, then mapped to the lower left symbol in the third quadrant at a first retransmission as illustrated in FIG. 7B, then mapped to the lower left symbol in the first quadrant at a second retransmission as illustrated in FIG. 7C, and then mapped to the upper right symbol in the third quadrant at a third retransmission as illustrated in FIG. 7D. The first two bits "00" of the coded bits "0011" assumes high reliability (H) in the first quadrant at the initial transmission. "11" are high-reliability bits in the third quadrant at the first retransmission, "00" are high-reliability bits in the first quadrant at the second retransmission, and "11" are high-reliability bits in the third quadrant at the third retransmission. This constellation rearrangement effects averaging the reliabilities of the coded bits. While the constellations illustrated in FIGS. 7A to 7D are defined to 16QAM, the same constellation rearrangement may occur in all high-order modulations.

The SMP matches priority to reliability, and the CoRe averages reliabilities irrespective of priority. Yet the two techniques commonly utilize bits with different reliabilities within a symbol.

However, the SMP and CoRe techniques cannot coexist because symbol mapping irrespective of priority discords with priority-based processing of coded bits.

SUMMARY OF THE INVENTION

It is, therefore, an object of the present invention to provide a data transmitting/receiving apparatus and method for improving system performance in a mobile communication system.

It is another object of the present invention to provide a data transmitting/receiving apparatus and method for increasing reliability in a mobile communication system.

It is also another object of the present invention to provide a data transmitting/receiving apparatus and method for enabling a receiver to receive high-priority bits with a relatively high reception probability at an initial transmission and retransmissions in a mobile communication system.

It is a further object of the present invention to provide a data transmitting/receiving apparatus and method for creating a synergy of benefits by combining SMP with HARQ (Hybrid Automatic Repeat Request).

It is still another object of the present invention to provide a data transmitting/receiving apparatus and method in which systematic bits are always mapped to a high-reliability part at an initial transmission and a plurality of retransmissions.

It is also still another object of the present invention to provide a data transmitting/receiving apparatus and method for averaging the reliabilities of systematic bits at an initial transmission and a plurality of retransmissions.

It is yet another object of the present invention to provide a data transmitting/receiving apparatus and method for averaging the reliabilities of coded bits differently depending on whether the coded bits are systematic bits or parity bits such that the average reliability of the systematic bits is higher than that of the parity bits.

To achieve the above and other objects, according to one aspect of the present invention, a transmitter has a plurality of constellations having exchanged high-reliability and low-reliability bit positions for bit-symbol mapping in a predetermined modulation scheme at an initial transmission and retransmissions and selects one of the constellations according to an initial transmission or the sequence number of a retransmission. The transmitter separately outputs transmission data as high-priority bits and low-priority bits, and exchanges the position of the high-priority bits with the position of the low-priority bits so that the high-priority bits are mapped to the high-reliability bit position and the low-priority bits are mapped to the low-reliability bit position.

According to another aspect of the present invention, in a transmitter that has a plurality of constellations with exchanged high-reliability and low-reliability bit positions for bit-symbol mapping in a predetermined modulation scheme at an initial transmission and retransmissions and selects one of the constellations according to an initial transmission or the sequence number of a retransmission, a channel encoder separately outputs transmission data as high-priority bits and low-priority bits, a first interleaver interleaves the high-priority bits, a second interleaver interleaves the low-priority bits, a PSC converts the outputs of the first and second interleavers to one coded bit stream, a position exchange exchanges the positions of the high-priority bits and the low-priority bits received from the PSC, and a rearrangement controller compares a previous constellation and a current constellation and controls the position exchange to exchange bit positions according to the comparison result.

According to a further aspect of the present invention, to receive data produced by mapping high-priority bits to a high-reliability bit position and low-priority bits to a low-reliability bit position in symbols in a receiver, the high-priority bits and the low-priority bits are demodulated from the high-reliability bit position and the low-reliability bit position, respectively in the symbols. According to whether a transmitter has exchanged the bit positions, the positions of the high-priority bits and the low-priority bits are controlled. If the transmitter has exchanged the bit positions, the position of the high-priority bits is exchanged with that of the low-priority bits in an original order. Then the high-priority bits and the low-priority bits are combined with previously received same bits.

According to still another aspect of the present invention, to receive data produced by mapping high-priority bits to a high-reliability bit position and low-priority bits to a low-reliability bit position in symbols, in a receiver, a demodulator demodulates the high-priority bits from the high-reliability bit position and the low-priority bits from the low-reliability bit position in the symbols, a position exchange exchanges the position of the high-priority bits with the position of the low-priority bits in an original order if a transmitter has exchanged the bit positions, a controller controls the positions of the high-priority bits and the low-priority bits according to whether the transmitter has exchanged the bit positions, and a combiner combines the high-priority bits and the low-priority bits with previously received same bits.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

CoRe discords with SMP. When SMP is used at an initial transmission and CoRe is used at a retransmission, systematic bits (i.e., high-priority bits) are mapped to a high-reliability (H) part at the initial transmission, and to a low-reliability (L) part at the retransmission. According to the present invention, the systematic bits are always mapped to the high-reliability part by exchanging the position of the systematic bits with the parity bits at the retransmission.

HARQ techniques include chase combining (CC), full incremental redundancy (FIR), and partial incremental redundancy (PIR) according to puncturing patterns used for channel encoding. At initial transmission and at retransmission, the same data is transmitted in CC, whereas different data is transmitted in FIR and PIR. Only parity bits are retransmitted in FIR, and systematic bits and parity bits are retransmitted in PIR. Therefore, SMP is implemented in a different manner according to the HARQ techniques. In the presence of transmission data, systematic bits and parity bits are mapped to a high-reliability part and a low-reliability part, respectively. On the other hand, in the absence of transmission data, parity bits are separated and then mapped to a high-reliability part and a low-reliability part.

Figure 8:
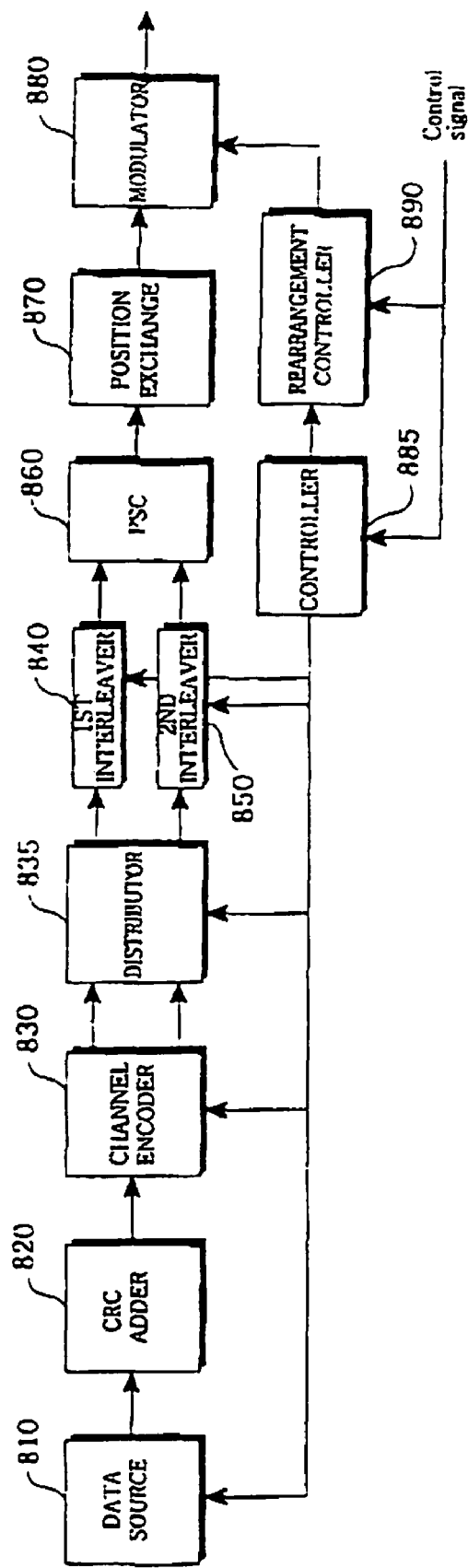
FIG. 8 is a block diagram of a transmitter in an HSDPA mobile communication system according to an embodiment of the present invention.

FIG. 8 is a block diagram of a transmitter in an HSDPA mobile communication system according to an embodiment of the present invention. Referring to FIG. 8, a CRC adder 820 adds CRC bits for error correction to data received from a data source 810. A channel encoder 830 encodes the CRC-attached data in a predetermined coding method such as turbo coding or systematic convolutional coding, and outputs systematic bits S and parity bits P. Specifically, the channel encoder 830 includes a plurality of constituent encoders for encoding input data at a mother code rate and a puncturer for puncturing coded bits in a predetermined puncturing pattern.

In incremental redundancy (IR), the channel encoder 830 is provided with a plurality of puncturing patterns and selectively uses them at each retransmission. In PIR, for example, a plurality of puncturing patterns are used in which initially transmitted systematic bits are preserved and parity bits are changed at each re-transmission. In FIR, a plurality of patterns are used in which systematic bits are punctured and different parity bits are transmitted at each retransmission. Therefore, the channel encoder 830 outputs systematic bits and parity bits at a retransmission in PIR, while it outputs only parity bits at a retransmission in FIR.

A distributor 835 distributes the systematic bits and the parity bits to a plurality of interleavers. If two interleavers 840 and 850 are used, the distributor 835 distributes them equally. When the channel encoder 830 uses a symmetrical code rate of ½, the distributor 835 feeds the systematic bits to the first interleaver 840 and the parity bits to the second interleaver 850. In this case, the distributor 835 is optional in the present invention because the number of the systematic bits is equal to that of the parity bits at a code rate of ½ and they are simply fed to the first and second interleavers 840 and 850, respectively. The distributor 835 is required only if the first and second interleavers 840 and 850 support a variable data length and an asymmetrical code rate. With a code rate of ¾, systematic bits and parity bits are produced at a ratio of 3:1 and the distributor 835 provides part of the systematic bits to the first interleaver 840 and the remaining systematic bits and the parity bits to the second interleaver 850. At a retransmission, the distributor 835 operates in the same manner as at an initial transmission in CC and PIR. In FIR, the distributor 835 separates the parity bits into two parity bit streams and distributes them equally to the first and second interleavers 840 and 850 at a retransmission.

At an initial transmission, the first interleaver 840 interleaves systematic bits received from the distributor 835 or the channel encoder 830. In FIR, the first interleaver 840 interleaves parity bits received from the distributor 835 at a retransmission. The second interleaver 850 interleaves parity bits received from the distributor 835 or the channel encoder 830.

A PSC 860 converts the parallel coded bits received from the first and second interleavers 840 and 850 to a serial bit stream. When the first interleaver 840 interleaves high-priority coded bits and the second interleaver 840 interleaves low-priority bits, the PSC 860 sequentially outputs the first interleaver output and the second interleaver output. Here, the ratio of the high-priority bits to the low-priority bits output from the PSC 860 is determined according to the code rate of the channel encoder 830 and the modulation scheme of a modulator 880 so that the high-priority bits, that is, the systematic bits, are mapped to a high-reliability part in a symbol. For example, in 16QAM, two high-priority coded bits are output and then two low-priority bits are output. Thus four coded bits are mapped to a modulation symbol. In 64QAM, three high-priority bits are output and then three low-priority bits are output. Thus six coded bits are mapped to a modulation symbol.

A rearrangement controller 890 determines whether to exchange the systematic bits with the parity bits output from the PSC 860 depending on whether a receiver has requested a retransmission, that is, whether an ACK or NACK signal has been received, and controls a position exchanger 870 correspondingly.

At an initial transmission requiring no position exchange, the position exchange 870 simply outputs the systematic bits and parity bits received from the PSC 860 under the control of the rearrangement controller 890. At a retransmission requiring position exchange, the position exchange 870 exchanges the positions of systematic bits and parity bits to be mapped to one symbol under the control of the rearrangement controller 890. The thus-operated position exchange 870 functions to map systematic bits and parity bits to be mapped to the same reliability parts at a retransmission as at an initial transmission. This enables coded bits to be mapped to modulation symbols by SMP. That is, high-priority bits are mapped to a high-reliability part and low-priority bits are mapped to a low-reliability part, irrespective of initial transmission or retransmission. The position exchange 870 is applicable to any of CC, PIR, and FIR, which will be described later in detail.

The modulator 880 maps the coded bits received from the position exchange 870 to modulation symbols, sequentially using a plurality of signal constellations as illustrated in FIGS. 7A to 7D at an initial transmission and at each retransmission under the control of the rearrangement controller 890. The modulator 880 receives information about a constellation to be used for initial transmission or retransmission from the rearrangement controller 890.

Though not shown in FIG. 8, the transmitter may further include a rate matcher for matching the rate of the coded bits received from the channel encoder by repetition or puncturing.

Figure 10:
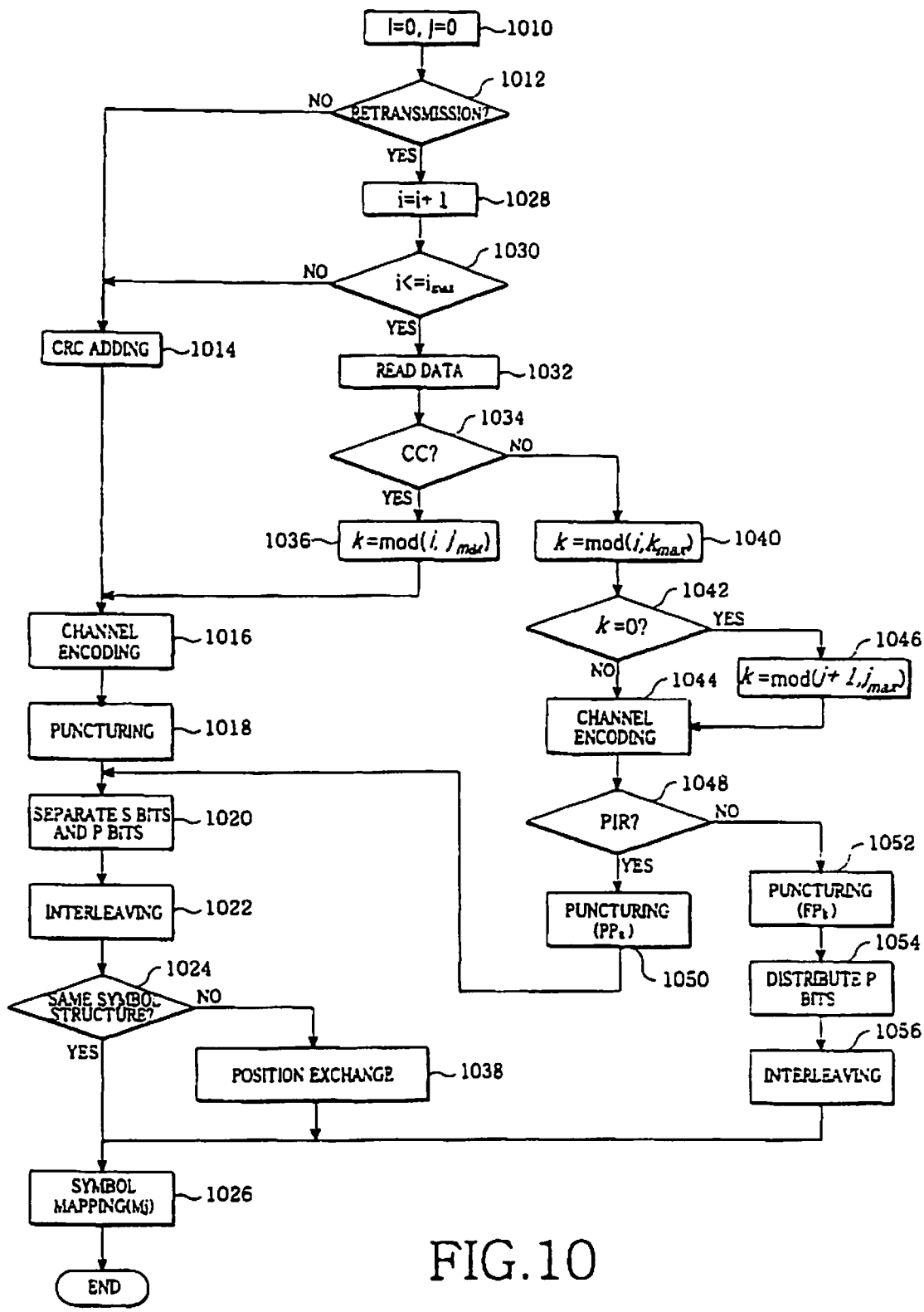
FIG. 10 is a flowchart illustrating the operation of the transmitter in the HSDPA mobile communication system according to the embodiment of the present invention.

Before describing the operation of the transmitter referring to FIG. 10, variables used in the flowchart of FIG. 10 are first defined below.

i: number of retransmission occurrences;
$i_{max}$: the maximum number of retransmission occurrences;
$k_{max}$: the total number of puncturing patterns;
$PP_k$: a PIR puncturing pattern for an index k (k=0, . . . $k_{max-1}$);
$FP_k$: an FIR puncturing pattern for an index k (k=0, . . . $k_{max-1}$);
j: an index that determines a constellation;
$j_{max}$: the total number of constellations; and
$M_j$: a constellation for an index j (=0, . . . $j_{max-1}$)

Referring to FIG. 10, i and j are set to their initial values 0 in step 1010 and it is determined whether a receiver has requested a retransmission in step 1012. In the case of initial transmission, step 1014 to step 1026 are performed. On the other hand, in the case of a retransmission, step 1018 to step 1056 are performed. Here, SMP is applied to an initial transmission and retransmission based on SMP is carried out in a different manner according to CC, PIR, and FIR.

Initial Transmission

Figure 7A:
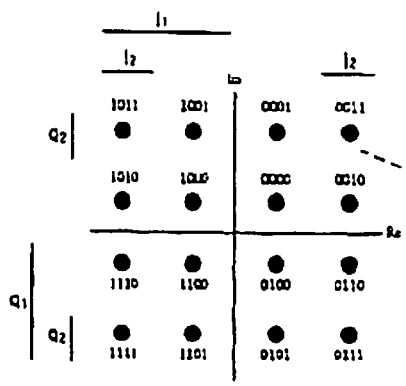
FIGS. 7A to 7D illustrate signal constellations for symbol mapping in the transmitter illustrated in FIG. 6.

At the initial transmission, the CRC adder 820 adds CRC bits to data received from the data source 810 in step 1014. The channel encoder 830 encodes the CRC-attached data at a predetermined mother code rate in step 1016. Systematic bits and parity bits output from the channel encoder 830 are punctured in a puncturing pattern $P_0$ for the initial transmission and thus systematic bits and parity bits are output according to a predetermined code rate in step 1018. The distributor 835 distributes the systematic bits to the first interleaver 840 and the parity bits to the second interleaver 850 in step 1020 and the first and second interleavers 840 and 850 separately interleave the systematic and parity bits, in step 1022. In step 1026, the modulator 880 maps the interleaved systematic and parity bits to modulation symbols using a signal constellation $M_0$ for j=0 as illustrated in FIG. 7A. At the initial transmission, step 1024 is omitted because no transmission has been carried out before and there is no symbol structure to be compared with the initial transmission data. Step 1024 will be described in detail later in connection with data retransmission.

Retransmission in CC

In the case of retransmission, i is increased by 1 in step 1028 and i is compared with $i_{max}$ in step 1030. The variable $i_{max}$ is used to limit the number of retransmissions. If i is equal to or greater than $i_{max}$, the retransmission is terminated and the procedure returns to step 1014. On the other hand, if i is less than $i_{max}$, retransmission data is read from a buffer in step 1032. Though not shown in FIG. 8, the buffer is a memory for temporarily storing data in case of retransmission before an ACK signal is received in a communication system supporting data retransmission. In step 1034, it is determined whether CC is used as an HARQ technique. In CC, initially transmitted systematic bits and parity bits are simply retransmitted. In IR, the systematic bits and parity bits are changed for retransmission.

Figure 7B:
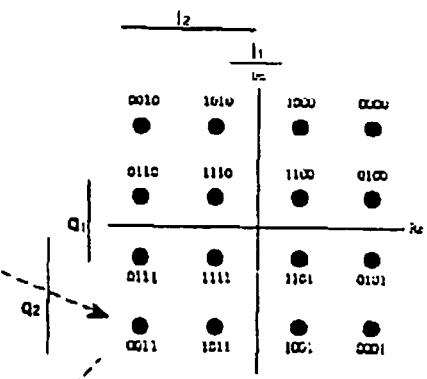
Figure 7C:
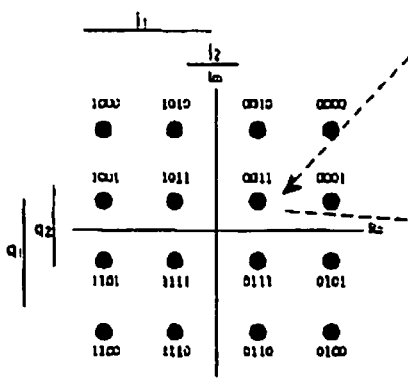
Figure 7D:
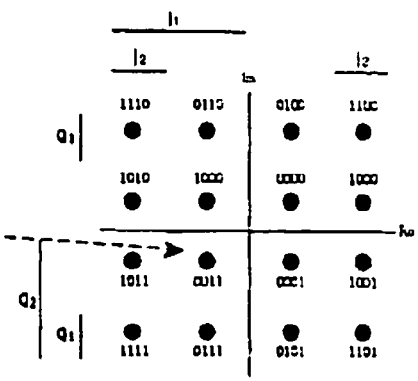

If the HARQ technique is CC, a constellation for symbol mapping at this retransmission is determined in step 1036. The index j indicating a constellation is determined by calculating modulo (i, $j_{max}$), Therefore, j is within a range from 0 to $j_{max-1}$ and $j_{max}$ constellations are cyclically used at retransmissions in CC. If j is 0, this means an initial transmission. As defined before, $j_{max}$ is the total number of available constellations for symbol mapping. When the constellations illustrated in FIGS. 7A to 7B are used, $j_{max}$ is 4. Hence a different constellation is used for symbol mapping at each retransmission in CC.

When the index j is determined in step 1036, step 1016 to 1022 are performed in the same manner as for the initial transmission. After interleaving in step 1022, the previous symbol structure is compared with a symbol structure for this retransmission. The symbol structure is equivalent to the relationship between coded bits and the reliability of their mapped part. For example, 16QAM has a symbol structure [H, H, L, L] with two first bits mapped to H determining a quadrant in a constellation. However, a different symbol structure is used at a retransmission. For example, a symbol structure [L, L, H, H] can be used at a first retransmission. Here, the last two coded bits mapped to H determine a quadrant in a constellation. Thus, to map systematic bits to a high-priority part at a retransmission by SMP, the current symbol structure must be compared with the previous symbol structure.

Referring to FIG. 7A, the first two bits of four coded bits for each symbol are mapped to "H" indicating a quadrant. If the first two bits are "00", they indicate the first quadrant, if the first two bits are "10", they indicate the second quadrant, if the first two bits are "11", they indicate the third quadrant, and if the first two bits are "01", they indicate the fourth quadrant. In the constellation for the first retransmission in 16QAM illustrated in FIG. 7B, the last two bits of four coded bits for each modulation symbol are mapped to "H" determining a quadrant. That is, if the last two bits are "00", they indicate the first quadrant, if the last two bits are "10", they indicate the second quadrant, if the last two bits are "11", they indicate the third quadrant, and if the last two bits are "01", they indicate the fourth quadrant. The reliability patterns, that is, symbol structures of the constellations illustrated in FIGS. 7A to 7D, vary in the order of [H, H, L, L], [L, L, H, H], [L, L, H, H] and [H, H, L, L]. The symbol structure for each odd-numbered retransmission is different from the symbol structure for the initial transmission, and the symbol structure for each even-numbered retransmission is identical to the symbol structure for the initial transmission.

If the symbol structure for the previous transmission is different from that of the constellation indicated by the index j for the current retransmission in step 1024, the position exchange 870 exchanges the positions of the previously transmitted systematic bits and parity bits received from the PSC 860 in step 1038. For example, if a symbol structure [H, H, L, L] is used for initial transmission and changed to [L, L, H, H] at a first retransmission, the position exchange 870 outputs two systematic bits after two parity bits, so the parity bits are mapped to "L" and the systematic bits to "H". Then if the symbol structure is changed to [H, H, L, L] at a second retransmission, the position exchange 870 outputs two parity bits after two systematic bits.

In step 1026, the modulator 880 maps the exchanged systematic bits and parity bits to modulation symbols in the jth constellation $M_j$ according to its symbol structure. This, the two exchanged parity bits are mapped to "L" and the two exchanged systematic bits, to "H" in the changed symbol structure.

Retransmission in PIR

If the HARQ technique is not CC in step 1034, which implies that it is IR, an index k is determined to select a puncturing pattern by which systematic bits and parity bits different from initially transmitted systematic bits and parity bits can be obtained in step 1040. The index k indicating a puncturing pattern is determined by calculating modulo (i, $k_{max}$). Therefore, k is within a range from 0 to $k_{max-1}$ and $k_{max}$ constellations are cyclically used at retransmissions in IR. As defined before, $k_{max}$ is the total number of available puncturing patterns for IR. IR includes PIR and FIR, and $k_{max}$ puncturing patterns are provided for each of PIR and FIR. The puncturing patterns include the puncturing pattern $P_0$ for the initial transmission.

When the index k is determined, it is determined whether k is 0 in step 1042. If k is 0, this implies that an initial transmission and ($k_{max}-1$) retransmissions have been carried out. In IR, four to six different puncturing patterns are usually used. If $k_{max}$ is 6, one initial transmission and five retransmissions occur with six puncturing patterns, since i=6, k=0. When IR is used for constellation rearrangement in conjunction with SMP according to the present invention, retransmissions using all available puncturing patterns are carried out by symbol mapping in the same constellation. In other words, a different constellation is used when the first puncturing pattern is cyclically selected again after all the puncturing patterns are used.

Therefore, when k=0, the index j is increased by 1 and j is updated to modulo (j+1, $j_{max}$) in step 1046.

If k is not 0 or j is updated, the channel encoder 830 encodes retransmission data at a predetermined mother code rate in step 1044 and it is determined whether PIR is used as an HARQ technique in step 1048. In the case of PIR, the channel encoder 830 punctures the coded bits including systematic bits and parity bits in a PIR puncturing pattern $PP_k$ corresponding to the index k in step 1050. Then the distributor 835 distributes the systematic bits and the parity bits to the first and second interleavers 840 and 850 in step 1020 and the first and second interleavers 840 and 850 interleave the systematic and parity bits, separately in step 1022. The PSC 860 converts the parallel interleaved systematic and parity bits to a serial bit stream. When a position exchange is required in step 1024, the position exchange 870 exchanges the positions of the systematic and parity bits in step 1038. On the other hand, if a position exchange is not required, the position exchange 870 simply outputs the systematic and parity bits received from the PSC 860. Only if k=0 in step 1042, is the position exchange required in PIR because each time k is 0, a different constellation is used. In step 1026, the modulator 880 maps the systematic and parity bits received from the position exchange 870 to modulation symbols using a signal constellation $M_j$.

To realize SMP-based signal rearrangement in PIR, bits encoded at a mother code rate are punctured in a kth puncturing pattern, interleaved, and then mapped to modulation symbols using a jth constellation at a kth retransmission.

Retransmission in FIR

If the HARQ technique is not PIR in step 1048, which implies that it is FIR, the channel encoder 830 punctures all the systematic bits and part of the parity bits in a puncturing pattern $FP_k$ corresponding to the index k in step 1052. Then the distributor 835 distributes the parity bits to the first and second interleavers 840 and 850 in step 1054 and the first and second interleavers 840 and 850 interleave the parity bits in step 1056. The PSC 860 converts the parallel interleaved parity bits to a serial bit stream. In FIR, the position exchange 870 simply output the parity bits received from the PSC 860 without position exchange. In step 1056, the modulator 880 maps the parity bits received from the position exchange 870 to modulation symbols using a signal constellation $M_j$.

Figure 9:
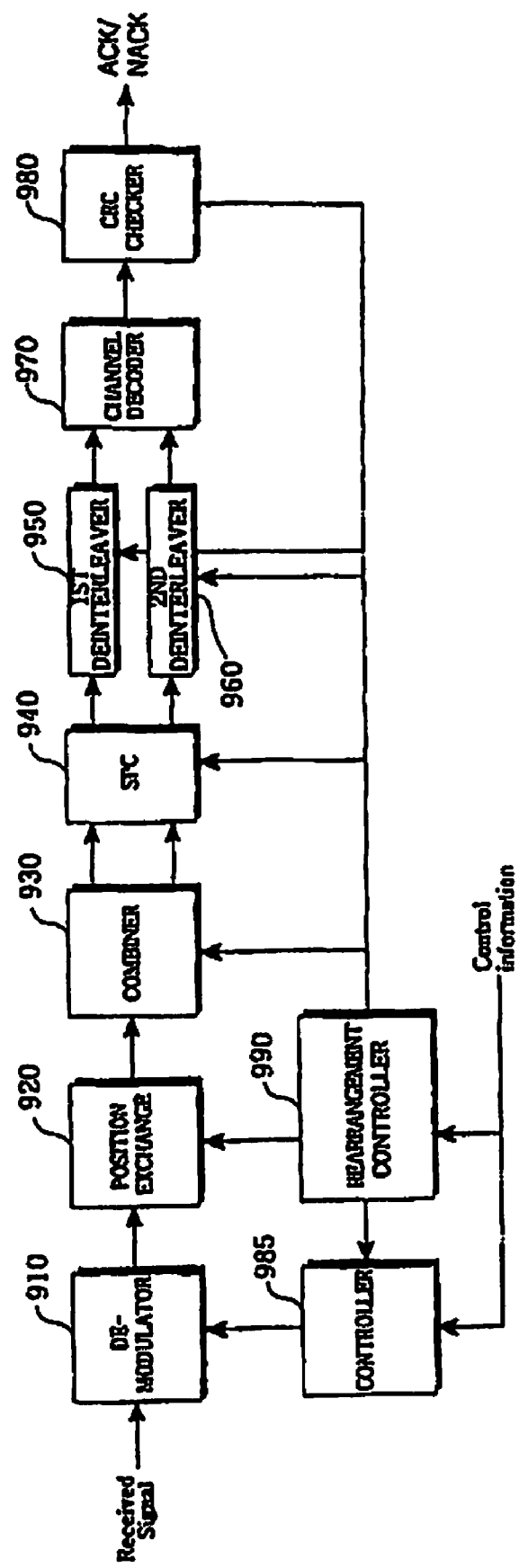
FIG. 9 is a block diagram of a receiver in the HSDPA mobile communication system according to the embodiment of the present invention.

FIG. 9 is a block diagram of a receiver in the HSDPA mobile communication system according to the embodiment of the present invention. Referring to FIG. 9, a demodulator 910 demodulates data received from the transmitter to coded bits in a demodulation method corresponding to the modulation scheme used in the modulator 880. The demodulator 910 uses the same constellation as used in the transmitter under the control of a rearrangement controller 990. If the transmitter exchanges the positions of systematic bits and parity bits to map the systematic bits to a high-reliability part, the receiver must exchange bit positions correspondingly. That is, the receiver must recover the original bit order at a position exchange 920 under the control of a controller 985.

A combiner 930 combines coded bits received from the position exchange 920 with previously received same data, on a bit-by-bit basis. When data retransmission is carried out by CC, the combiner 930 combines coded bits on a bit-by-bit basis each time it receives them. In the case of PIR, the combiner 930 combines systematic bits at each transmission and combines parity bits in a predetermined period. In the case of FIR, the combiner 930 combines parity bits periodically because only parity bits are transmitted at each retransmission. The combining period is the period of repeating puncturing patterns used in the transmitter. The combiner output is separated according to priority, for separate deinterleaving.

Then an SPC (Serial-to-Parallel) converter 940 converts a serial bit stream received from the combiner 930 to parallel streams. For example, if the modulator 880 employs 16QAM, the SPC 940 switches first two bits for one symbol to a first deinterleaver 950 and the two following bits to a second deinterleaver 960. If the modulation scheme is 64QAM, the SPC 940 switches the first three bits for one symbol to the first deinterleaver 950 and the three following bits to the second deinterleaver 960. Meanwhile, if the transmitter uses interleavers supporting an asymmetrical code rate and a variable length, the SPC 940 must know the variable length so that it can output coded bits of the size of the first interleaver 840 to the first deinterleaver 950 and output coded bits of the size of the second interleaver 850 to the second deinterleaver 960.

The first and second deinterleavers 950 and 960 deinterleave the coded bits received from the SPC 940 in a deinterleaving method corresponding to the interleaving in the first and second interleavers 840 and 850. The interleaving pattern is preset between the transmitter and the receiver. For example, the transmitter may notify the receiver of the interleaving pattern as system information before communication. When SMP is applied in the present invention, the first deinterleaver 950 and the second deinterleaver receive the systematic bits and the parity bits and deinterleave them, separately.

A channel decoder 970 receives the deinterleaver outputs and decodes systematic bits using parity bits for error correction in a predetermined decoding method corresponding to the coding in the transmitter.

A CRC checker 980 checks CRC bits in the decoded bits and determines whether to request a retransmission of the data according to the CRC check result. If the data has errors and its retransmission is requested, an NACK signal is transmitted to the transmitter. On the other hand, if the data is normal and its retransmission is not needed, an ACK signal is transmitted to the transmitter and the next data is received.

As described above, high-priority coded bits (systematic bits) and low-priority coded bits (parity bits) are always respectively mapped to a high-reliability part and a low-reliability part in a symbol irrespective of initial transmission or retransmission. Therefore, when CoRe is used for data retransmission, the reliabilities of the systematic bits are averaged always in the high-reliability part and the reliabilities of the parity bits are averaged always in the low-reliability part. As a result, the average reliability of the systematic bits is higher than that of the parity bits.

Figure 11:
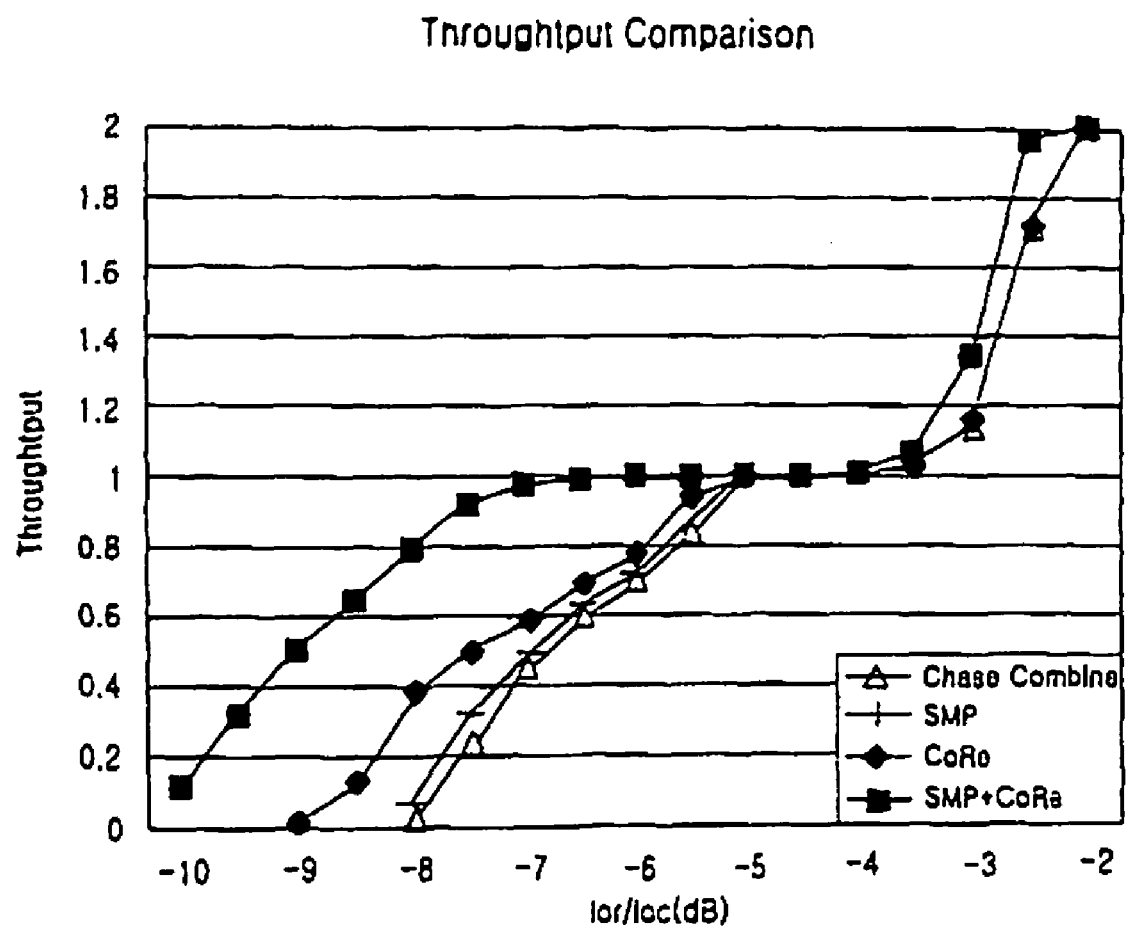
FIG. 11 illustrates graphs showing a comparison in performance between symbol mapping according to the present invention and conventional symbol mapping.

FIG. 11 illustrates graphs showing a comparison in throughput among a conventional retransmission scheme, CC, SMP and CoRe under discussion, and the priority-based discriminate reliability averaging method (SMP+CoRe) according to the present invention. While each technique can be combined with an IR technique, it is used in combination with CC here.

Referring to FIG. 11, SMP has a 0.1 to 0.3 dB gain increase from CC and CoRe has a 0 to 0.5 dB increase from CC. However, a combined use of SMP and CoRe according to the present invention brings a 0.3 to 2.3 dB gain increase, which is a remarkable improvement.

While the embodiment of the present invention considers only the reliabilities of the four quadrants in a constellation when SMP is applied, reliability differs in a plurality of symbols in each quadrant. Thus another embodiment can be contemplated by combining SMP with CoRe further considering the reliabilities of the symbols.

Figure 1:
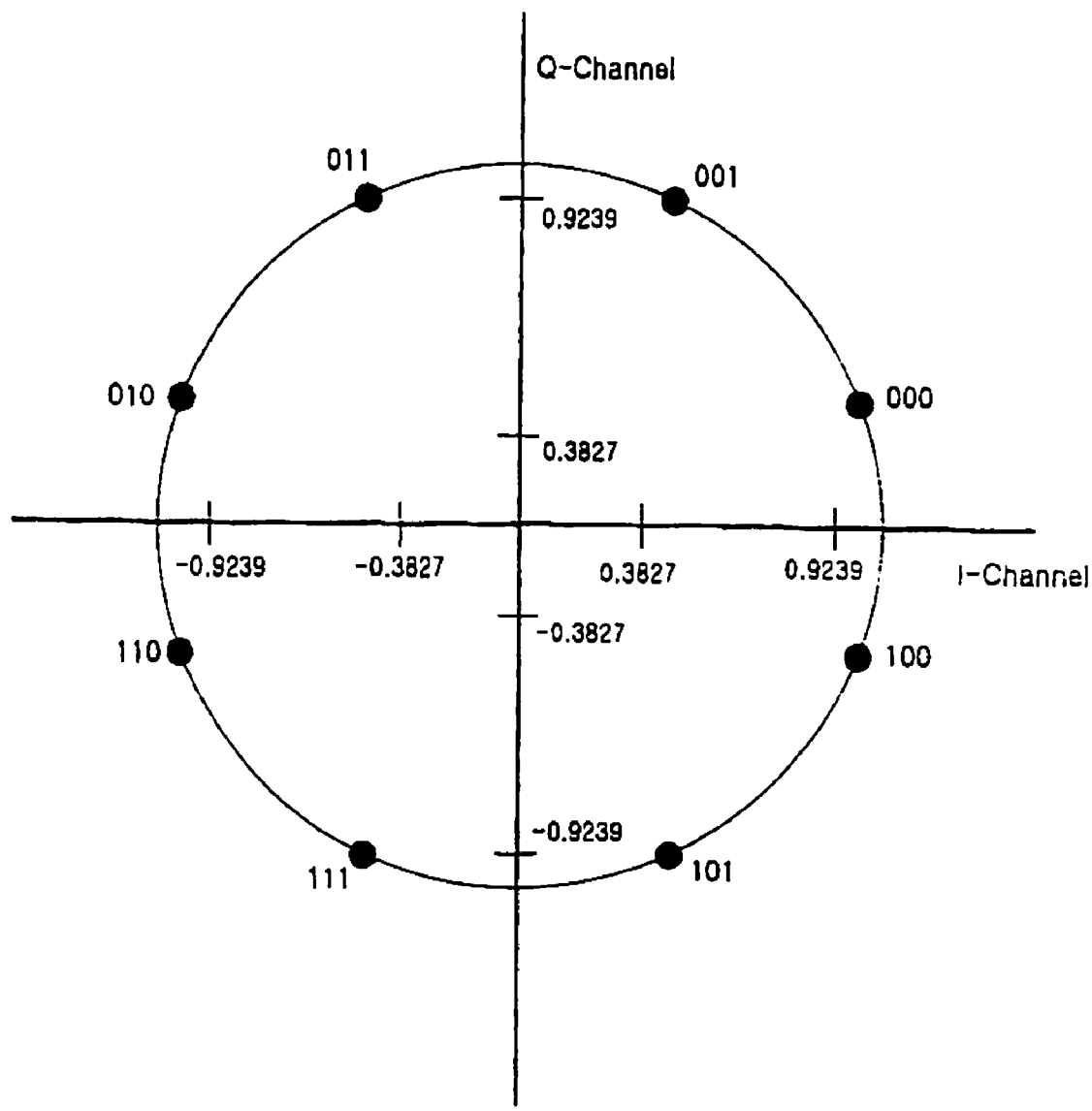
FIG. 1 illustrates a 8PSK signal constellation.
Figure 2:
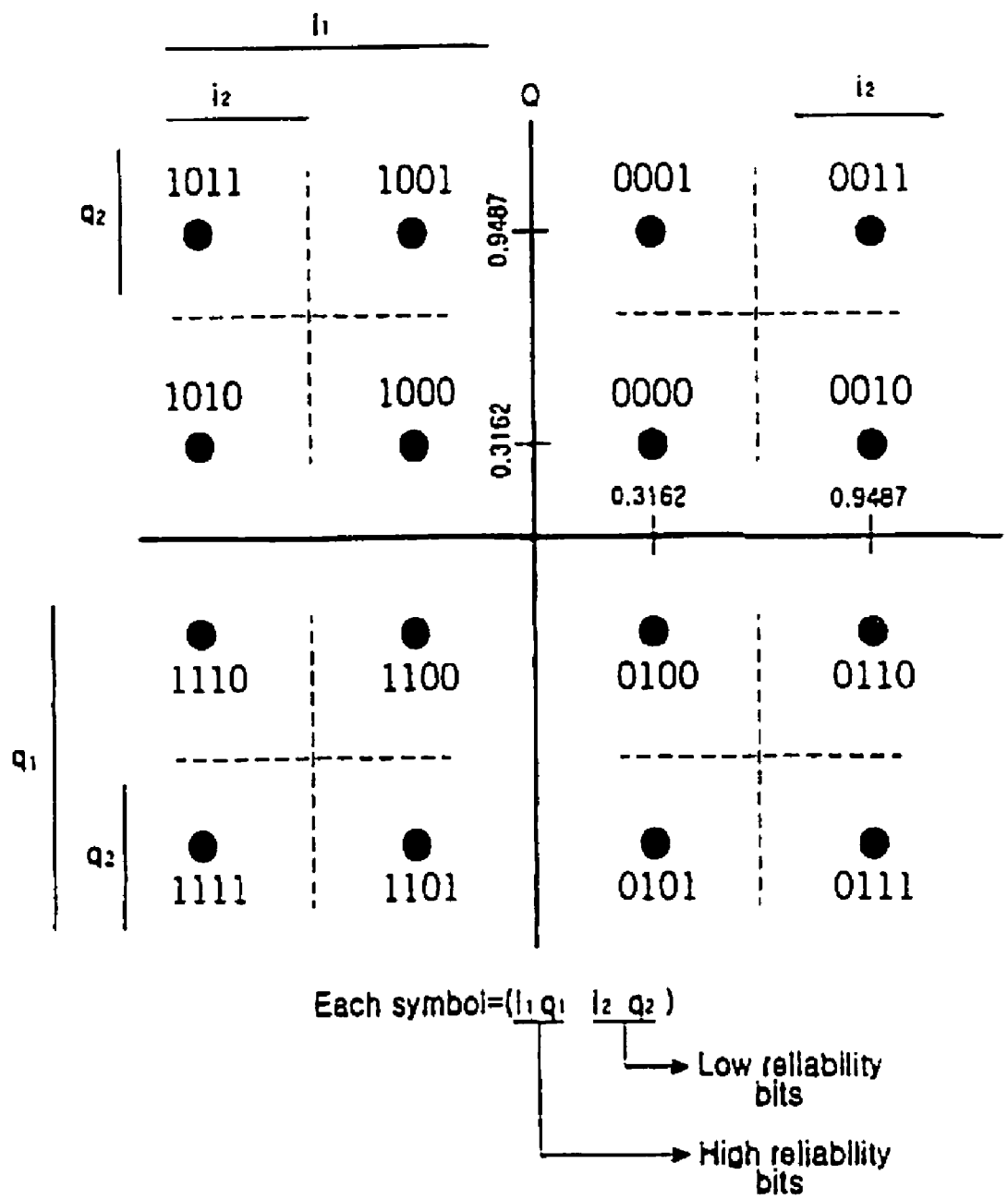
FIG. 2 illustrates a 16QAM signal constellation.
Figure 3:
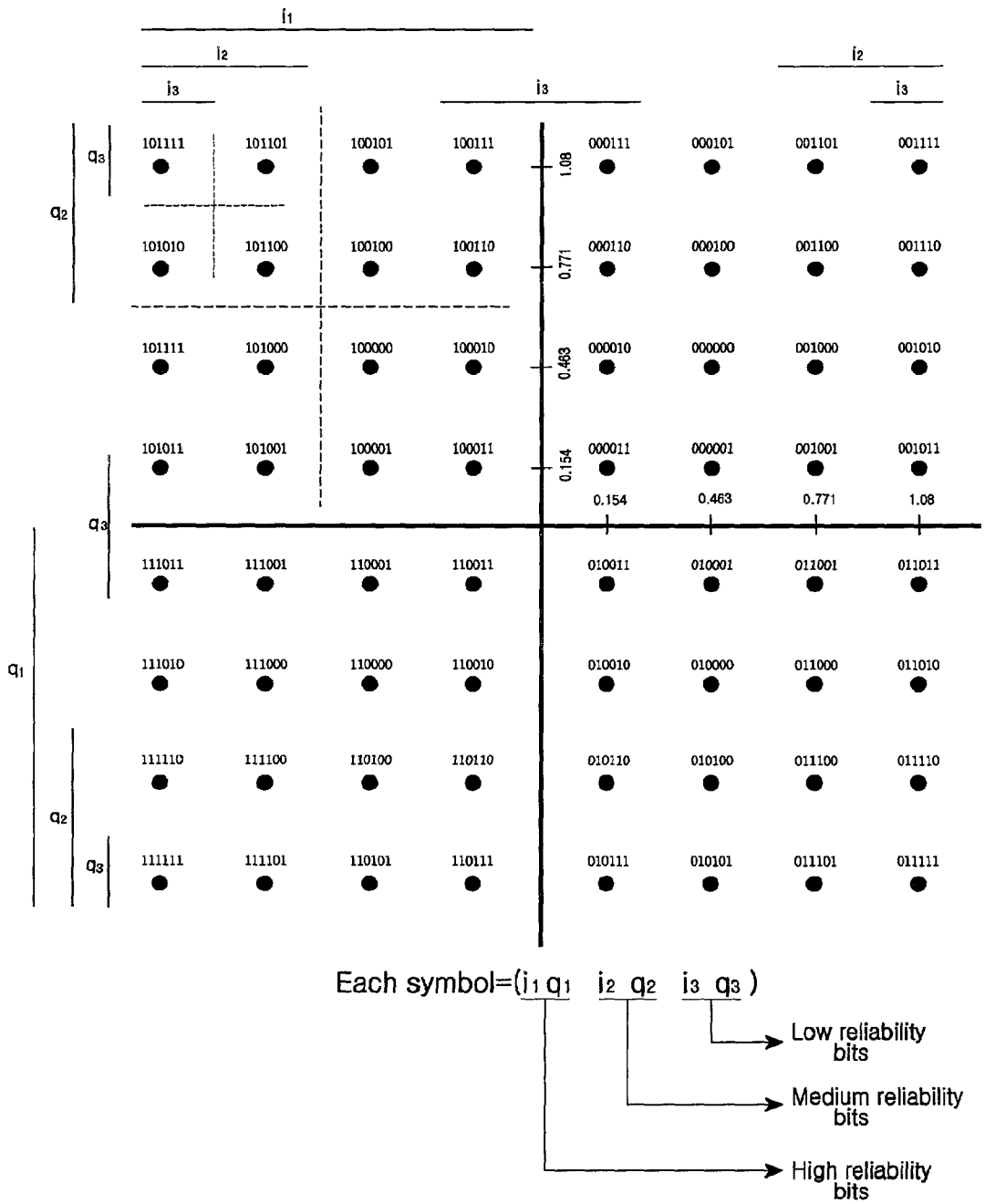
FIG. 3 illustrates a 64QAM signal constellation.
Figure 4:
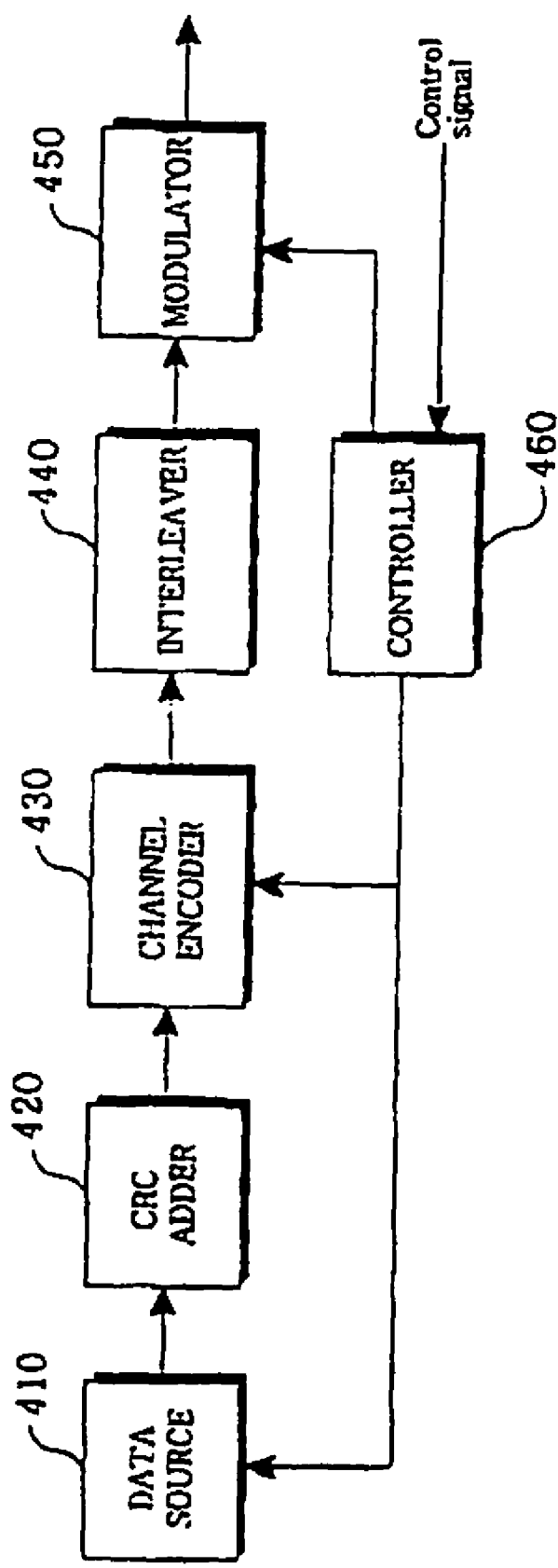
FIG. 4 is a block diagram of a transmitter in a typical HSDPA mobile communication system.
Figure 5:
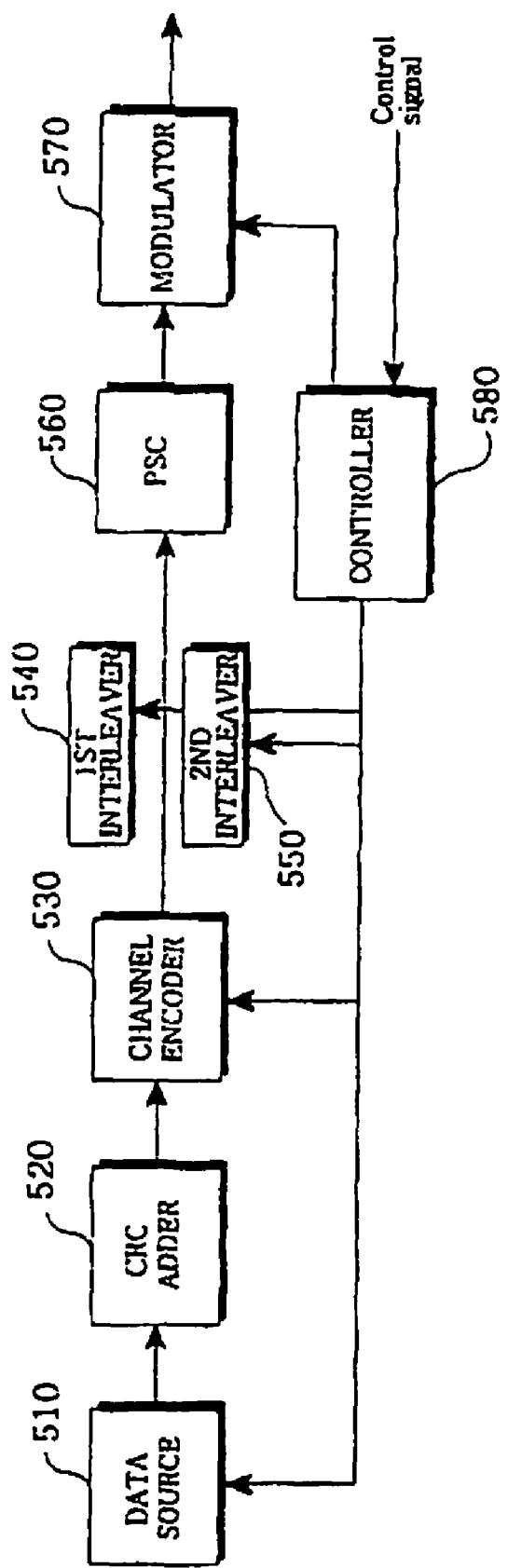
FIG. 5 is a block diagram of a transmitter in a conventional HSDPA mobile communication system supporting SMP.
Figure 6:
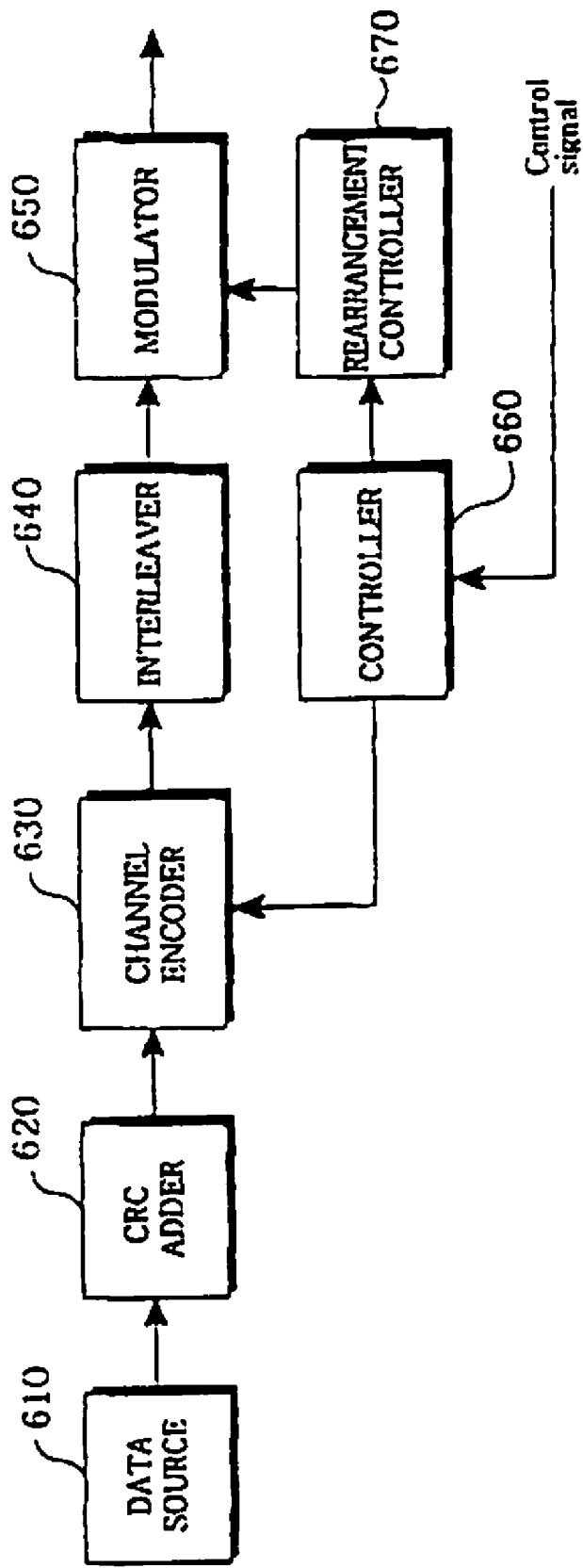
FIG. 6 is a block diagram of a transmitter in a conventional HSDPA mobile communication system supporting CoRe.

To describe it in detail, common bits in the symbols of each quadrant in a constellation have been defined as high-reliability (H) bits ($i_1$ and $q_1$ in FIGS. 2 and 3). Only if a symbol is received in a wrong quadrant, the high-reliability bits will have errors. Therefore, they have a less error probability than low-reliability bits. However, reliability differs in the high-reliability bits. Referring to FIG. 2, since the four symbols in each quadrant initially have the same two bits and the two high-reliability bits have errors when the symbols are transmitted in a wrong quadrant, symbols near to the axes are lower in reliability than symbols far from the axes. Therefore, the four symbols can be divided into three reliability regions. That is, a symbol near to both axes has a low reliability, two symbols near to one of the axes and far from the other axis have a medium reliability, and a symbol far from both axes has a high reliability.

When data retransmission does not occur, the probability of transmitting all systematic bits in high reliability symbols even with SMP is only ¼. Since the systematic bits are mapped to a high reliability part, a sufficient gain is achieved. Nevertheless, it is more important to achieve a high average reliability of the systematic bits. Therefore, coded bits are separately mapped to a high-reliability part and mapped to a low reliability part according to their priority levels at an initial transmission and the high reliabilities and the low reliabilities are separately averaged, resulting in different average reliabilities according to the priority levels.

In accordance with the present invention as described above, a combined use of SMP and CoRe creates a synergy of benefits. High-priority bits are mapped to high-reliability bit positions which are more robust against noise or other adverse environmental factors, and thus have a higher average reliability than low-priority bits at retransmissions. As a result, a much higher performance gain is achieved. As compared to existing systems, a frame error rate (FER) is decreased and the overall system performance is improved irrespective of wired or wireless communication, especially in the third generation wires communication system (IMT-2000).

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of receiving data produced by mapping high-priority bits to a high-reliability bit position and low-priority bits to a low-reliability bit position in symbols, in a receiver in a mobile communication system, comprising the steps of:
    demodulating the high-priority bits from the high-reliability bit position and the low-priority bits from the low-reliability bit position in the symbols;
    controlling the positions of the high-priority bits and the low-priority bits according to whether a transmitter has exchanged the bit positions;
    exchanging the position of the high-priority bits with the position of the low-priority bits in an original order if the transmitter has exchanged the bit positions; and
    combining the high-priority bits and the low-priority bits with previously received same bits.

2. An apparatus for receiving data produced by mapping high-priority bits to a high-reliability bit position and low-priority bits to a low-reliability bit position in symbols, in a receiver in a mobile communication system, comprising:
    a demodulator for demodulating the high-priority bits from the high-reliability bit position and the low-priority bits from the low-reliability bit position in the symbols;
    a position exchange for exchanging the position of the high-priority bits with the position of the low-priority bits in an original order if a transmitter has exchanged the bit positions;
    a controller for controlling the positions of the high-priority bits and the low-priority bits according to whether the transmitter has exchanged the bit positions; and
    a combiner for combining the high-priority bits and the low-priority bits with previously received same bits.

* * * * *